US012782115B2

(12) United States Patent
Kennedy et al.

(10) Patent No.: US 12,782,115 B2
(45) Date of Patent: Nov. 3, 2026

(54) ATTACHMENT FOR AN ELASTOGRAPHY AND/OR IMAGING DEVICE

(71) Applicant: ONCORES MEDICAL PTY LTD, Nedlands (AU)

(72) Inventors: Brendan Kennedy, Walliston (AU); Philip Wijesinghe, St Andrews (GB); James Anstie, Mount Lawley (AU); Daniel Firth, Highgate (AU); Luke Frewer, Mount Lawley (AU)

(73) Assignee: OncoRes Medical Pty Ltd, Nedlands (AU)

( * ) Notice: Subject to any disclaimer, the term of this patent is extended or adjusted under 35 U.S.C. 154(b) by 321 days.

(21) Appl. No.: 18/702,557

(22) PCT Filed: Oct. 18, 2022

(86) PCT No.: PCT/AU2022/051251
§ 371 (c)(1),
(2) Date: Apr. 18, 2024

(87) PCT Pub. No.: WO2023/064982
PCT Pub. Date: Apr. 27, 2023

(65) Prior Publication Data

US 2025/0277660 A1 Sep. 4, 2025

(30) Foreign Application Priority Data

Oct. 19, 2021 (AU) ................................ 2021903355

(51) Int. Cl.
*G01B 11/16* (2006.01)
*G01B 9/02091* (2022.01)
(Continued)

(52) U.S. Cl.
CPC .......... *G01B 11/16* (2013.01); *G01B 9/02091* (2013.01); *G01B 17/04* (2013.01); *G01L 1/24* (2013.01)

(58) Field of Classification Search
None
See application file for complete search history.

(56) References Cited

U.S. PATENT DOCUMENTS 4,796,632 A * 1/1989 Boyd .................. A61B 8/4281 73/644
5,598,845 A * 2/1997 Chandraratna ........ A61B 8/582 600/459
(Continued)

FOREIGN PATENT DOCUMENTS

EP 3201566 8/2017
WO 2016119011 8/2016
(Continued)

OTHER PUBLICATIONS

J. Li et al, “An optical fibre dynamic instrumented palpation sensor for the characterisation of biological tissue ”, Sensors and Actuators A: Physical, vol. 225, Feb. 9, 2015, pp. 53-60, ISSN 0924-4247, https://doi.org/10.1016/j.sna.2015.01.036.
(Continued)

*Primary Examiner* — Peter J Macchiarolo
*Assistant Examiner* — Jermaine L Jenkins
(74) *Attorney, Agent, or Firm* — Heslin Rothenberg Farley & Mesiti P.C.

(57) ABSTRACT

The present disclosure provides an attachment for an elastography and/or imaging device. The device has a transmission portion for transmission of electromagnetic radiation or acoustic waves towards a sample material. The attachment comprises a securing portion for securing the attachment to the device. The attachment further has a sensing portion coupled to the securing portion. The sensing portion is
(Continued)

adapted to receive a deformable sensing layer that is at least partially transmissive for the electromagnetic radiation or the acoustic waves. The attachment is arranged such that, when attached to the device and the sensing layer is received at the sensing portion, the electromagnetic radiation is in use transmitted through the sensing layer or the acoustic waves are transmitted through the sensing layer towards the sample material, and when a load is applied to the sample material through the sensing layer, the sensing layer deforms.

18 Claims, 5 Drawing Sheets

(51) Int. Cl.

| | |
|---|---|
| ***G01B 17/04*** | (2006.01) |
| ***G01L 1/24*** | (2006.01) |

(56) References Cited

U.S. PATENT DOCUMENTS

| | | | |
|---|---|---|---|
| 6,261,231 B1 | 7/2001 | Damphousse | |
| 9,441,946 B2 | 9/2016 | Massow | |
| 9,652,696 B2 | 5/2017 | Won | |
| 10,311,343 B2 | 6/2019 | Won | |
| 10,687,710 B2 | 6/2020 | Blank | |
| 11,132,057 B2 | 9/2021 | Keesling | |
| 11,206,986 B2 | 12/2021 | Liu | |
| 12,588,946 B2 * | 3/2026 | Romoscanu ....... | A61B 18/1492 |
| 2009/0116032 A1 | 5/2009 | Zara | |
| 2012/0265061 A1 | 10/2012 | Sliwa et al. | |
| 2018/0042480 A1 | 2/2018 | Liu | |

FOREIGN PATENT DOCUMENTS

| | | |
|---|---|---|
| WO | 2017185145 | 11/2017 |
| WO | 2019071295 | 4/2019 |
| WO | 2020082133 | 4/2020 |

OTHER PUBLICATIONS

B. F. Kennedy et al, "A Review of Optical Coherence Elastography: Fundamentals, Techniques and Prospects", IEEE Journal of Selected Topics in Quantum Electronics, vol. 20, No. 2, pp. 272-288, Mar.-Apr. 2014, Art No. 7101217, doi: 10.1109/JSTQE.2013.2291445.

Extended European Search Report issued in European Application No. EP22882101.3, European Patent Office, mailed Jul. 17, 2025, 6 pages.

Intellectual Property India, Examination Report under sections 12 & 13 of the Patents Act, 1970 and the Patents Rules, 2003., for Indian Application No. 202417034632, dated Apr. 7, 2026, 7 pages.

* cited by examiner

ATTACHMENT FOR AN ELASTOGRAPHY AND/OR IMAGING DEVICE

CROSS REFERENCE TO RELATED APPLICATIONS

This application is a national stage filing under section 371 of PCT International Application No. PCT/AU2022/051251, filed on Oct. 18, 2022, and published on Apr. 27, 2022, as WO2023064982A1, which claims priority to Australian Application No. AU2021903355, filed on Oct. 19, 2021, which published on Nov. 4, 2021 as AU2021903355A0. The entire contents of which are hereby expressly incorporated herein by reference.

FIELD OF THE INVENTION

The present invention relates to an attachment for an elastography device and/or imaging device, and more specifically, although not exclusively, to a removable attachment for an optical elastography device.

BACKGROUND OF THE INVENTION

Elastography techniques based on optical imaging, ultrasound imaging and magnetic resonance imaging (MRI) are commonly used to characterise deformation of a sample material, such as a biological tissue, and evaluate stiffness and other mechanical properties of the sample.

In recent years, there has been development in elastography techniques such as in optical coherence tomography (OCT)-based elastography. The present applicant has developed an optical elastography technique that uses a compliant sensing layer compressed against a surface of a sample material. This technique is disclosed in PCT international patent application no. PCT/AU2016/000019, which is herewith incorporated by cross-reference. The present applicant has further developed an optical elastography device, which is digital camera-based and may be handheld. This device and a method for evaluating a mechanical property, such as elasticity, of a sample material using the optical elastography device, are disclosed in PCT international patent application PCT/AU2019/051171, which is herewith also incorporated by cross-reference.

The present invention provides further improvement.

SUMMARY OF THE INVENTION

In accordance with a first aspect of the present invention, there is provided an attachment for an elastography and/or imaging device, the device having a transmission portion for transmission of electromagnetic radiation or acoustic waves towards a sample material, the attachment comprising:

a securing portion for securing the attachment to the device; and a sensing portion coupled to the securing portion, the sensing portion being adapted to receive a deformable sensing layer that is at least partially transmissive for the electromagnetic radiation or the acoustic waves;

wherein the attachment is arranged such that, when attached to the device and the sensing layer is received at the sensing portion, the electromagnetic radiation is in use transmitted through the sensing layer or the acoustic waves are transmitted through the sensing layer towards the sample material, and when a load is applied to the sample material through the sensing layer, the sensing layer deforms.

The attachment may be arranged such that, when attached to the device and the sensing layer is received at the sensing portion, the electromagnetic radiation is in use transmitted through the sensing layer or the acoustic waves are transmitted through the sensing layer towards the sample material, and when the load is applied to the sample material through the sensing layer, the sensing layer can expand laterally relative to a longitudinal axis of the device.

The sensing layer comprises in one specific embodiment a material that has a largely incompressible volume. However, in an alternative embodiment the sensing layer may also comprise a material that is at least partially compressible.

The device may comprise a probe and the attachment may be arranged for attachment to the probe.

The attachment may comprise the sensing layer, which may be located at the sensing portion.

The sensing layer may be located at the sensing portion using straps or layers of a material which may be flexible. The sensing layer may be sandwiched between the layers or straps.

The attachment may further comprise a lubrication material at the sensing layer to reduce friction between the sensing layer and the straps or layers of the flexible material or another material with which the sensing layer may in use be in contact.

The attachment may comprise a cavity into which the sensing layer can laterally expand or into which the lubrication material can penetrate when the axial load is applied to the sample material through the sensing layer.

Further, the attachment may comprise an end-portion at the sensing portion, the end-portion comprising an undulated edge having projections projecting inwardly, the projections being separated by recesses, wherein the end-portion is arranged such that a portion of the sensing layer can laterally expand and/or the lubrication material can penetrate into or through the recesses between the projections when the axial load is applied to the sample material through the sensing layer.

A cross-sectional shape of the attachment may be approximately U-shaped when the sensing layer is received by the attachment.

The attachment may have a generally cylindrical shape.

The securing portion may have at least one side portion arranged for engaging with a side portion of the device and the sensing portion of the attachment may be a bottom portion coupled to the at least one side portion.

The attachment may be adapted for removably attaching to the device.

The at least one side portion of the attachment is in one embodiment arranged to engage with the side portion of the device using a twist-lock or Luer-lock mechanism. In this embodiment the side portion of the attachment may be provided with a keyway or key and the device may be provided with a complementary key or keyway. Alternatively, the side portion of the attachment may be provided with an at least partially threaded bore, and the side portion of the device may be provided with a complementary outer thread.

Alternatively, the at least one side portion may comprise a male locking portion arranged to interlock with a female locking portion of the side portion of the device.

The at least one side portion of the attachment is in this embodiment arranged to engage with the side portion of the device using a snap-fit.

The attachment may further comprise a protective sheath arranged to cover at least a portion of an exposed area of the attachment, the protective sheath may be clamped between elements of the securing portion or between elements of the securing portion and the device when the attachment is attached to the device. The protective sheath may also extend along at least a portion of an exposed area of the device when the attachment is attached to the device.

In an alternative embodiment the protective sheath is a first protective sheath and is arranged to cover at least a portion of an exposed area of the attachment and may be clamped between elements of the securing portion or between elements of the securing portion and the device when the attachment is attached to the device. The attachment further comprises in this embodiment a second protective sheath arranged to cover at least a portion of an exposed area of the device when the attachment is attached to the device. The second protective sheath may also be clamped between elements of the securing portion or between elements of the securing portion and the device when the attachment is attached to the device.

At least outer surface portions and typically also the inner surface portions of the attachment may be formed from a bio-compatible material.

The device in one embodiment and an optical elastography device. In this embodiment, the attachment may comprise an optical imaging window at the sensing portion and the optical elastography device with the attachment may be arranged to direct the electromagnetic radiation from the optical elastography device through the imaging window and, when the sensing layer is received at the sensing portion, subsequently through the sensing layer towards the sample material.

The optical elastography device may be an optical coherence tomography-based elastography device.

The sensing layer may have a predetermined deformation-dependent optical property, which may be detectable using optical means using for example a digital or stereoscopy camera set-up as disclosed in the applicant's co-pending PCT international application PCT/AU2019/051171, which is herewith incorporated by cross-reference. In one example the sensing layer includes particles and may have a deformation dependent transmissivity as also disclosed in the applicant's co-pending PCT international application PCT/AU2019/051171.

In an alternative embodiment, the elastography device is an ultrasonic-based or MRI-based elastography device.

The elastography device may be hand-held and the attachment may be disposable.

The sensing layer may comprise a silicone material.

In accordance with a second aspect of the present invention, there is provided an elastography and/or imaging system, comprising:

- an elastography and/or imaging device having a transmission portion for transmission of electromagnetic radiation or acoustic waves towards a sample material;
- an attachment securable to the device, the attachment being provided in accordance with the first aspect of the present invention; and
- a deformable sensing layer coupled to the attachment at the sensing portion;
- wherein the elastography system is arranged such that, when the device is used, the electromagnetic radiation is transmitted through the sensing layer or the acoustic waves are transmitted through the sensing layer towards the sample material, and when a load is applied to the sample material through the sensing layer, the sensing layer deforms.

The system may be arranged such that the electromagnetic radiation transmitted through the sensing layer or the acoustic waves are transmitted through the sensing layer towards the sample material, and when the load is applied to the sample material through the sensing layer, the sensing layer expands laterally relative to a longitudinal axis of the device.

The sensing layer comprises in one specific embodiment a material that has a largely incompressible volume. However, in an alternative embodiment the sensing layer may also comprise a material that is at least partially compressible.

The device may comprise a probe and the probe may have an end-portion for transmission of electromagnetic radiation or acoustic waves towards the sample material.

A sensing surface of the sensing layer may be adapted for positioning in direct or indirect contact with a surface area of the sample material.

The system may in one embodiment an optical device and the sensing layer may have a predetermined deformation-dependent optical property. The optical system may in this embodiment be arranged such that a mechanical property of the sample material is measurable by detecting electromagnetic radiation or acoustic waves that transmitted through the sensing layer from the sample material in response to electromagnetic radiation or acoustic waves which were transmitted through the sensing layer towards the sample material.

The system may be an elastography system and the device may be an elastography device having a transmission portion for transmission of electromagnetic radiation or acoustic waves towards a sample material. The elastography device may be an optical elastography device.

BRIEF DESCRIPTION OF THE DRAWINGS

Embodiments of the present invention will now be described, by way of example only, with reference to the accompanying figures, in which:

FIG. 1 (*b*) is a schematic perspective representation of the attachment of FIG. 1 (*a*);

DETAILED DESCRIPTION OF SPECIFIC EMBODIMENTS

Ultrasound elastography, MRI-based elastography and optical coherence elastography techniques can be used to map the mechanical properties of biological tissue, such as stiffness (elasticity). As the mechanical properties of biological tissue may be affected by diseases such as cancer, one of the applications of these techniques relates to the identification of cancerous tissue, which is usually "stiffer" than surrounding soft tissue.

The present applicant has previously developed an optical elastography technique in which a compressive load is applied to a sample material through a deformable sensing layer positioned between a probe and the sample material. The sensing layer comprises a transparent silicone material, which is incompressible and, therefore, deforms under the application of the compressive load by expanding in a plane transversal to the applied load to preserve its volume. The thickness of the sensing layer thus changes in response to the local stiffness of the underlying sample material and using, for example optical, coherence tomography (OCT), the change in thickness of the sensing layer induced by the compressive load can be measured to provide a measure for the local stress of the underlying sample material. Using OCT, strain in the sample can also be determined, which together with the determined stress in the sample can provide the stiffness of the sample.

Embodiments of the present invention provide an attachment for an elastography and/or imaging device that is arranged such that a deformable sensing layer having an incompressible volume can be used without compromising the change in thickness of the sensing layer (for example by obstructing the lateral expansion of the layer) as a function of a change in "stiffness' of the underlying sample material.

In a specific embodiment, the attachment is disposable and is adapted for removably securing to the elastography and/or imaging device.

Figure 1:
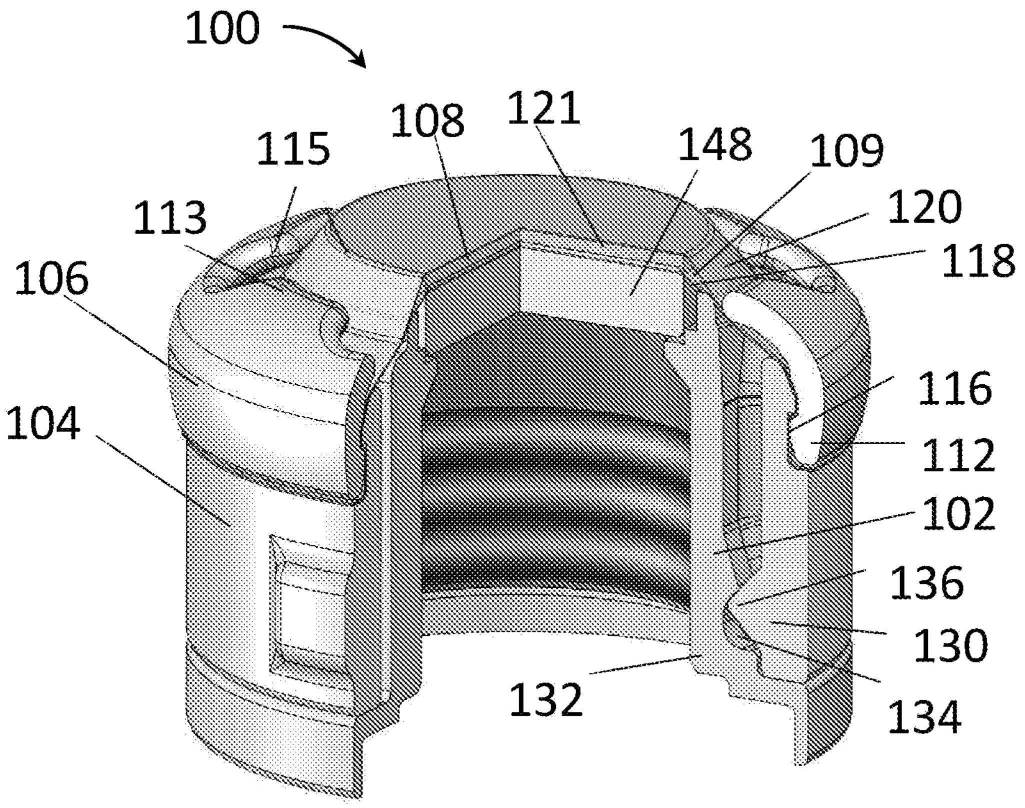
FIG. 1 (*a*) is a schematic perspective representation of an attachment for an elastography and/or imaging device in accordance with an embodiment with the attachment being secured to an end portion of a probe of the device.
Figure 1:
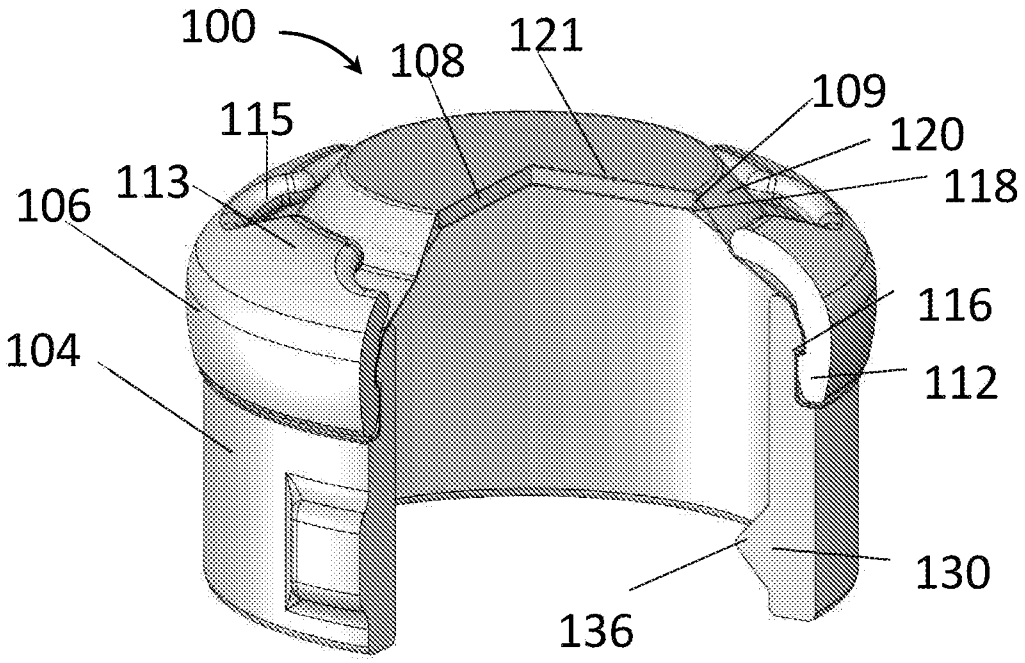
Figure 2:
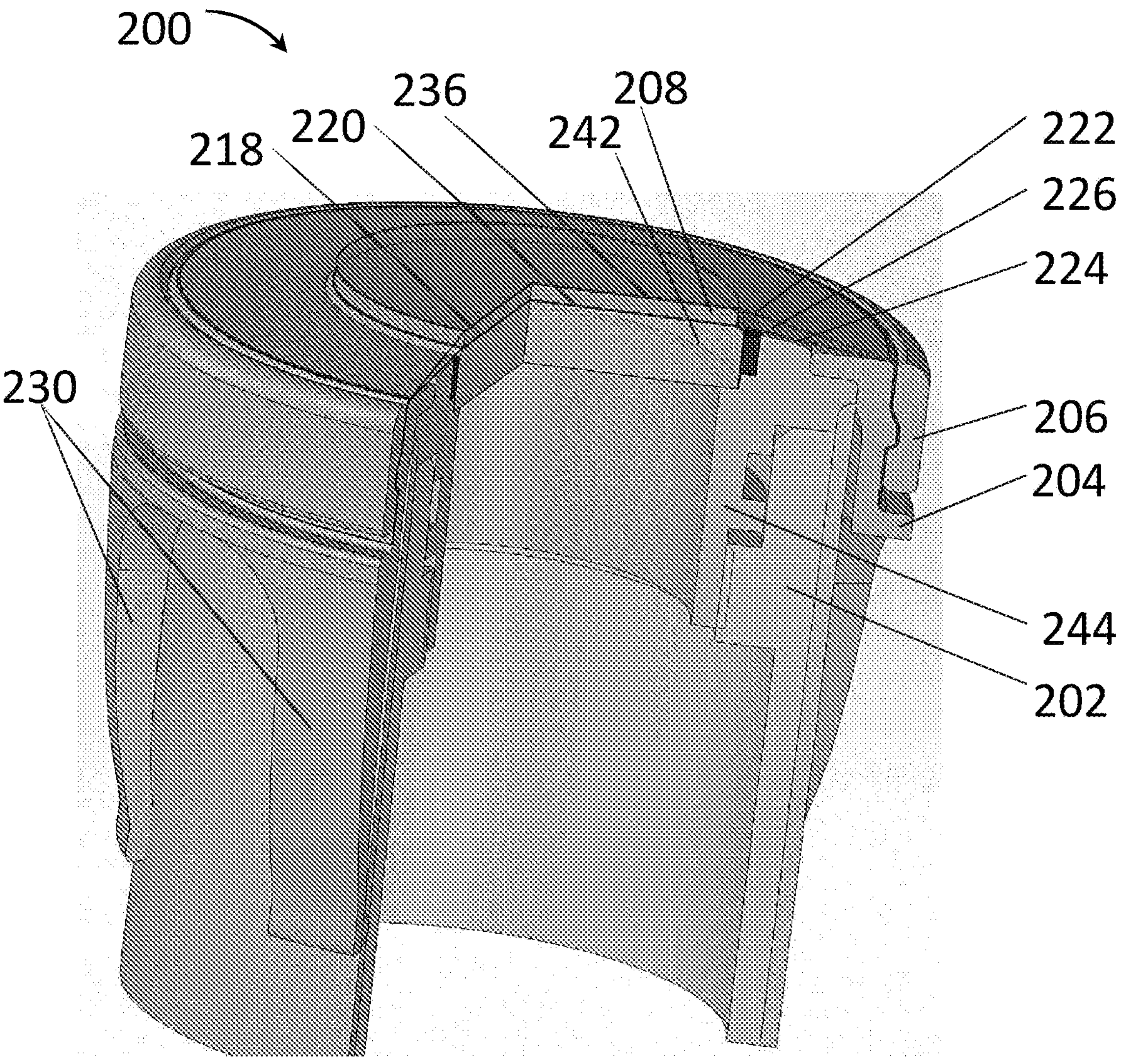
FIG. 2 is a schematic perspective representation of an attachment for an elastography device in accordance with another embodiment with the attachment being secured to a probe of the device.

With reference to FIGS. 1 and 2, a specific embodiment of the attachment will be described. In this embodiment the attachment is suitable for an optical elastography device and is adapted to be secured to an optical probe of the device. However, it will be understood that embodiments of the present invention are not limited to applications in optical elastography. For example, the device may alternatively be an ultrasonic device or an MRI device and may or may not be an imaging device.

FIG. 1(*a*) is a perspective view of an attachment 100 secured to an optical probe 102 of an optical elastography device and FIG. 1(*b*) shows the attachment 100 in isolation. The attachment 100 comprises a securing portion 104 for securing the attachment 100 on the optical probe 102. The optical probe 102 has a transmission portion (not shown) for transmission of electromagnetic radiation towards the sample material (also not shown). The attachment 100 further comprises a ring-like portion 106, which is coupled to the securing portion 104 and is adapted to receive a deformable sensing layer 108 that is at least partially transmissive for the electromagnetic radiation. The attachment 100 is arranged such that, when attached to the probe 102 and the sensing layer 108 is received (as shown in FIGS. 1(*a*) and 1(*b*)), the electromagnetic radiation is transmitted through the sensing layer 108 towards the sample material, and when an axial load is applied through the sensing layer 108, the sensing layer 108 can expand laterally relative to a longitudinal axis of the probe 102.

A person skilled in the art will appreciate that in an alternative embodiment in which the device is an ultrasonic device, the probe will have a transmission portion for transmission of acoustic or ultrasonic waves and the attachment will be adapted to receive a sensing layer that is at least partially transmissive for the acoustic or ultrasonic waves.

The attachment 100 with the sensing layer 108 has a U-shaped cross-sectional shape and is generally cylindrical and components of the attachment 100 are formed from a flexible polymeric material. As will now be described in more detail, the ring-like portion 106 is in this example coupled to the securing portion 104 using an annular compression. An inner surface of the ring-like portion 106 has a projection 112 and an outer surface of the securing portion 104 has a corresponding recess 116 which is arranged to engage with the projection 112.

In the present embodiment, the attachment 100 comprises the sensing layer 108, which is coupled to the ring-like portion 106 using layers 118, 120. The sensing layer 108 is sandwiched between the layers 118, 120, which hold the sensing layer 108 at the ring-like portion 106 and are formed from a flexible material. The attachment 100 is arranged such that, when attached to the probe 102 and the sensing layer 108 is received and coupled to the ring-like portion 106, a sensing surface 121 of the sensing layer 108 is in indirect contact with the sample material (not shown).

The layers 118, 120 are secured between the ring-like portion 106 and the securing portion 104 and an outer dimension of the sensing layer 108 is chosen such that a cavity 109 is defined between the outer portions of the layers 118, 120 at an edge-portion of the sensing layer 108. The sensing layer 108 is located by the layers 118, 120 so as to enable a lateral expansion of the sensing layer 108 into the cavity 109 relative to a longitudinal axis of the probe 102 when an axial load is applied through the sensing layer 108.

A lubrication material is also provided between the layers 118, 120 and the sensing layer 108. The lubrication material is selected to reduce friction between the sensing layer 108 and the layers 118, 120. The attachment 100 is arranged such that, when the axial load is applied through the sensing layer 108, the lubrication material is allowed to flow into the cavity 109 into which the material of the sensing layer 108 can also laterally expand. The lubrication material may be any suitable material reduce friction between the sensing layer 108 and the layers 118, 120 and may be for example be a silicone oil, a vegetable oil or a synthetic liquid such as hydrogenated polyolefins, esters, or fluorocarbons. By reducing the friction between the sensing layer 108 and the layers 118, 120 the change in thickness more accurately corresponds to change in 'stiffness' of the underlying sample material. Consequently, the resolution of the optical elastography technique can be improved.

The ring-like portion 106 also has an end-portion which has an undulated edge formed by projections 113 projecting inwardly and recesses 115. The end-portion is arranged such that a portion of the sensing layer 108 and/or the lubrication material can penetrate into or through the recesses 115 between the projections 113 when the axial load is applied to the sample material through the sensing layer 108. The projections 113 and also further portions of the attachment 100 may comprise a radiopaque material or coating.

The securing portion 104 has a side portion 130 that is arranged for engaging with a side portion 132 of the probe 102 using a twist-lock or Luer-lock mechanism. An inner surface of the side portion 130 comprises a projection 136 and an outer surface portion of the probe 102 has a recess 134. Further, the probe 102 has a key-way (not shown) along which a projection (or "key") 136 of the side portion 130 can be guided in a direction along an axis of the attachment 100. A twisting movement of the attachment 100 relative to the probe 102 then engages the projection 136 with the recess 134 to secure the attachment 100 onto the probe 102.

The probe 102 comprises an imaging window 148. In a variation of the described embodiment the imaging window may also form a part of the attachment 100 and may be positioned at the layer 120. An adhesive material may be used to hold the imaging window at the layer 118. Electromagnetic radiation is directed from the probe 102 through the imaging window 148 and subsequently through the sensing layer 108.

Figure 3:
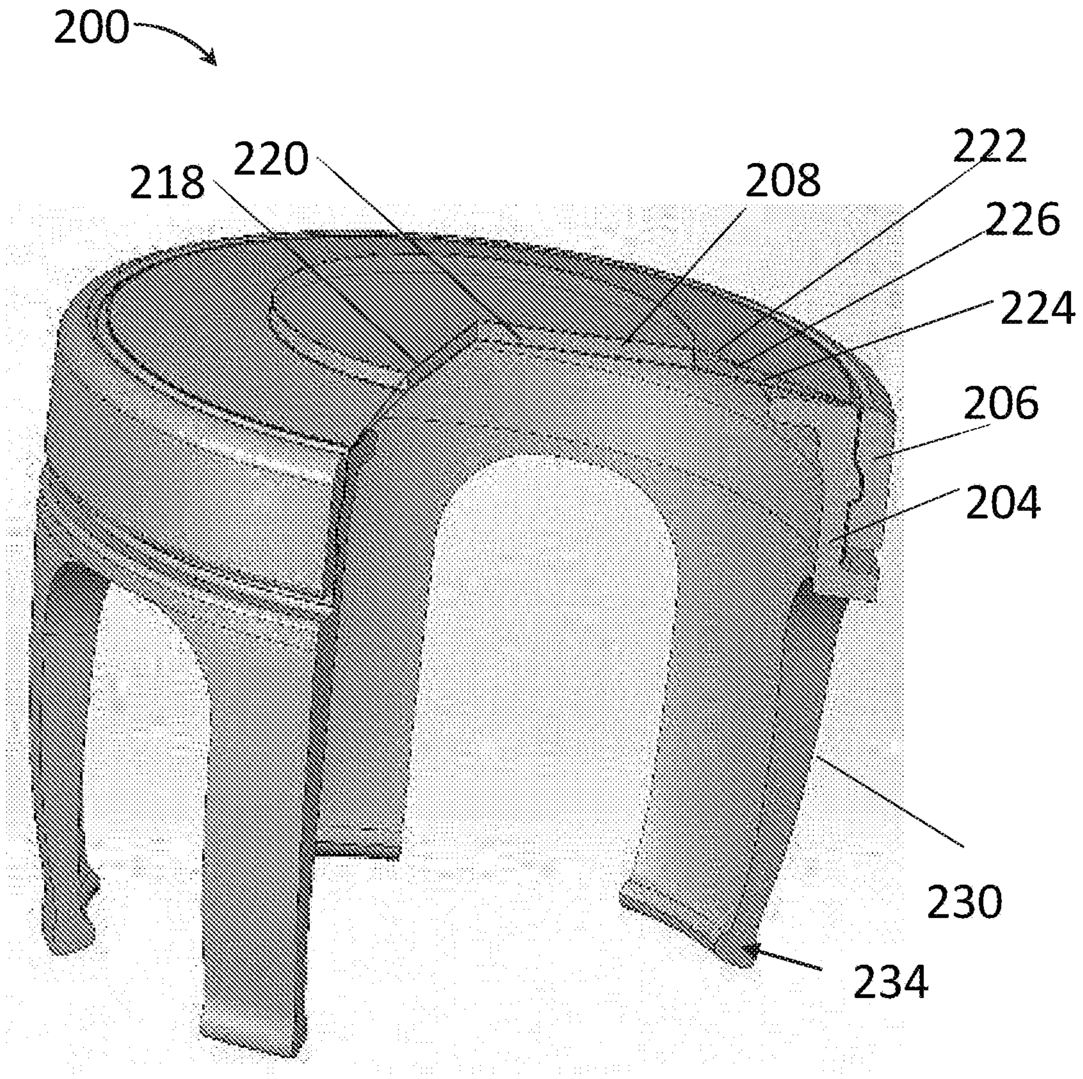
FIG. 3 is a perspective view of the attachment of FIG. 2, when not attached to the probe of the device.
Figure 4:
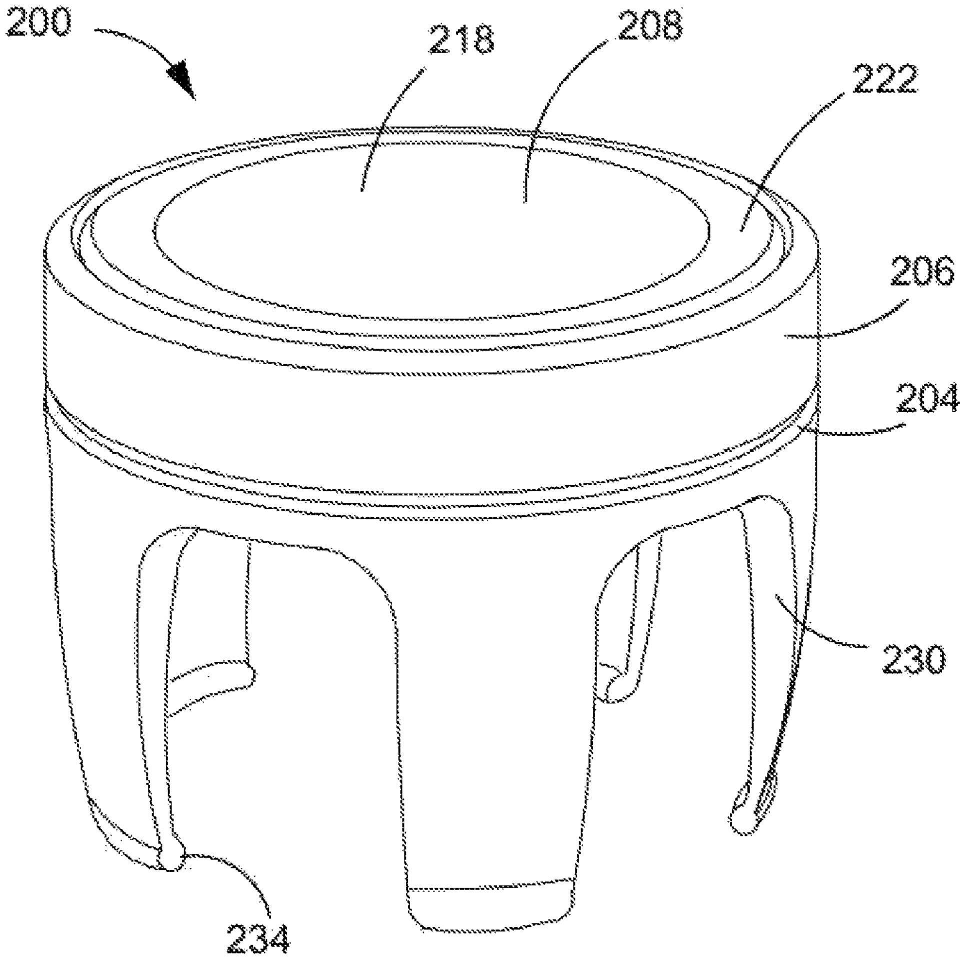
FIG. 4 is a photograph of the attachment of FIGS. 2 and 3.

FIGS. 2, 3 and 4 illustrate an attachment 200 in accordance with another embodiment of the present invention. The attachment 200 is adapted for securing to an optical probe 202. The attachment 200 comprises a securing portion 204 for securing the attachment 200 to the probe 202 of a device, such as an optical elastography device. The probe 202 is in this embodiment an optical probe and has a transmission portion (not shown) for transmission of electromagnetic radiation towards a sample material (not shown). The attachment 200 further comprises a ring-like portion 206, which is coupled to the securing portion 204 by means of an arrangement similar to the arrangement described with reference to FIGS. 1(*a*) and 1(*b*). The ring-like portion 206 is adapted to receive a sensing layer 208 that is at least partially transmissive for the electromagnetic radiation. The attachment 200 is arranged such that, when attached to the optical probe 202 and the sensing layer 208 is received at the ring-like portion 206 (as shown in FIG. 2), the electromagnetic radiation is transmitted through the sensing layer 208 to the sample material, and when an axial load is applied through the sensing layer 208, the sensing layer 208 can expand laterally relative to a longitudinal axis of the probe 202.

The attachment 200 comprises the sensing layer 208, which is coupled to the ring-like portion 206 using layers 218, 220 of a flexible material as was described for attachment 100 above with reference to FIGS. 1(*a*) and 1(*b*). The attachment 200 has a U-shaped cross-sectional shape and is generally cylindrical. The ring-like portion 206 is coupled to the securing portion 204 using a snap-fit mechanism. The sensing layer 208 is sandwiched between the layers 218, 220, which hold the sensing layer 208 at the ring-like portion 206. The sensing layer 208 has dimensions selected such that a lateral expansion of the sensing layer 208 between the layers 218, 220 is possible. The layers 218, 220 are secured between the surfaces of the ring-like portion 206 and the securing portion 204 in a manner such that a cavity 226 is defined between the of layers 218, 220. A lubrication material is provided at the periphery of the sensing layer 208. The lubrication material is arranged to reduce friction between the sensing layer 208 and the layers 218, 220. As for the attachment 100, the lubrication material may be any suitable material that reduces friction between the sensing layer 208 and the layers 218, 220 and may for example be a silicone oil, a vegetable oil or a synthetic liquid such as hydrogenated polyolefins, esters or fluorocarbons.

The securing portion 204 has in this embodiment 5 side portions or prongs 230 that are arranged for engaging with a side portion 232 of the probe 202 in a friction-fit. The attachment 200 has dimensions suitable for being secured to the probe 202 and each side portion 230 has dimensions and a shape such that each side portion 230 can maintain in firm contact with the probe 202 when the attachment 200 is positioned on the probe 202.

The attachment 200 is thus arranged such that, when attached to the probe 202 (as shown in FIG. 2), a sensing surface 236 of the sensing layer 208 is adapted for positioning in indirect contact with a surface area of the sample material.

In one embodiment, the attachment 200 comprises an imaging window 242 at the layer 220 whereby, when the attachment 200 is attached to the end portion of the probe 202, the imaging window 242 is positioned between the end of the probe 202 and the sensing layer 208. This arrangement is such that the electromagnetic radiation is directed from the probe 202 through the imaging window 242 and subsequently through the sensing layer 208 to the sample material. In the embodiment shown in FIGS. 2 to 4 a window mount 244 is further provided to accommodate the imaging window 242 to the shape of the probe 202.

The attachments 100, 200 in accordance with either one of the described embodiments comprises a protective sheath (not shown) which is attached to the securing portion 104, 204 or the ring-like portion 106, 206 in any suitable manner such that when the attachment 100, 200 is secured to the probe 102, 202, the protective sheath extends along the securing portion 104, 204 of the attachment 100, 200 and is clamped between elements of the securing portion 104, 204. For example, an end portion of the protective sheath may be secured between the inner surfaces of the ring-like portion 106, 206 and the outer surfaces of the securing portion 104, 204. The protective sheath may also extend along a portion of an exposed area of the device when the attachment 100, 200 is attached to the device. Alternatively, the attachment 100, 200, may comprise a further sheath (not shown) which is also clamped between elements of the securing portion 104, 204 but extends to cover an exposed area of the device 100, 200 when the attachment 100 is attached to the device.

When the attachment 100, 200 is secured to the probe 102, 202 and the optical elastography device is used, a sensing surface 121, 236 of the sensing layer 108, 208 is positioned in indirect contact with a surface area of a sample material (not shown) through the layer 118, 218. The layers 118, 120, 218, 220 assist in preventing contamination of the sample material and the probe, and in ensuring sterile conditions during use.

The sample material may be a biological tissue or a biological material. Alternatively, the sample material may comprise another elastic or material, such as a polymeric material that may have a non-uniform hardness or flexibility.

The sensing layers 108, 208 may comprise a silicone material or another suitable material.

It will be understood that other materials that are and are at least partially transmissive for the electromagnetic radiation are further envisaged for the sensing layer. Further, embodiments are envisaged in which the sensing layer is receiving in a manner such that, when the attachment is secured to the probe of the device and the device is used, a sensing surface of the sensing layer is positioned in direct contact with a surface area of a sample material.

In an alternative embodiment the attachment uses a deformable sensing layer that has a deformation dependent optical property. In this embodiment the change in thickness of the sensing layer upon application of the compressive load may not have to be detected, but the change in the optical property (such as a change in colour or transmissivity of the layer; the change in the optical property may for example be detected using stereoscopic vison or UV fluorescence technologies as disclosed in the applicant's co-pending PCT international application PCT/AU2019/051171) is a measure for the change in thickness (and the stiffness of the underlying sample material).

Further, in an embodiment in which the probe is an acoustic probe, the sensing layer comprises a deformable material that is at least partially transmissive for acoustic waves.

All parts of the attachment 100, 200 are in this embodiment formed from a bio-compatible material. Alternatively, it is envisaged that at least outer surface portions of the attachment 100, 200 be formed from a bio-compatible material. Further, in one embodiment, all parts of the attachment 100, 200 are disposable.

It will be understood that other embodiments are envisaged for the attachment wherein the sensing portion may be coupled to the securing portion in any other suitable manner and wherein the sensing layer may be received at the sensing portion in any other suitable manner.

The attachment 100, 200 is in this embodiment attached to an optical probe of a hand-held optical elastography device for evaluating a mechanical property of a sample material, such as is disclosed in the present Applicant's PCT international patent application PCT/AU2019/051171. However, a skilled addressee will understand that the attachment in accordance with embodiments of the present invention may also be attached to an optical probe of a hand-held optical imaging device that has no elastography capabilities and or a probe of an ultrasonic device or an MRI device.

Figure 5:
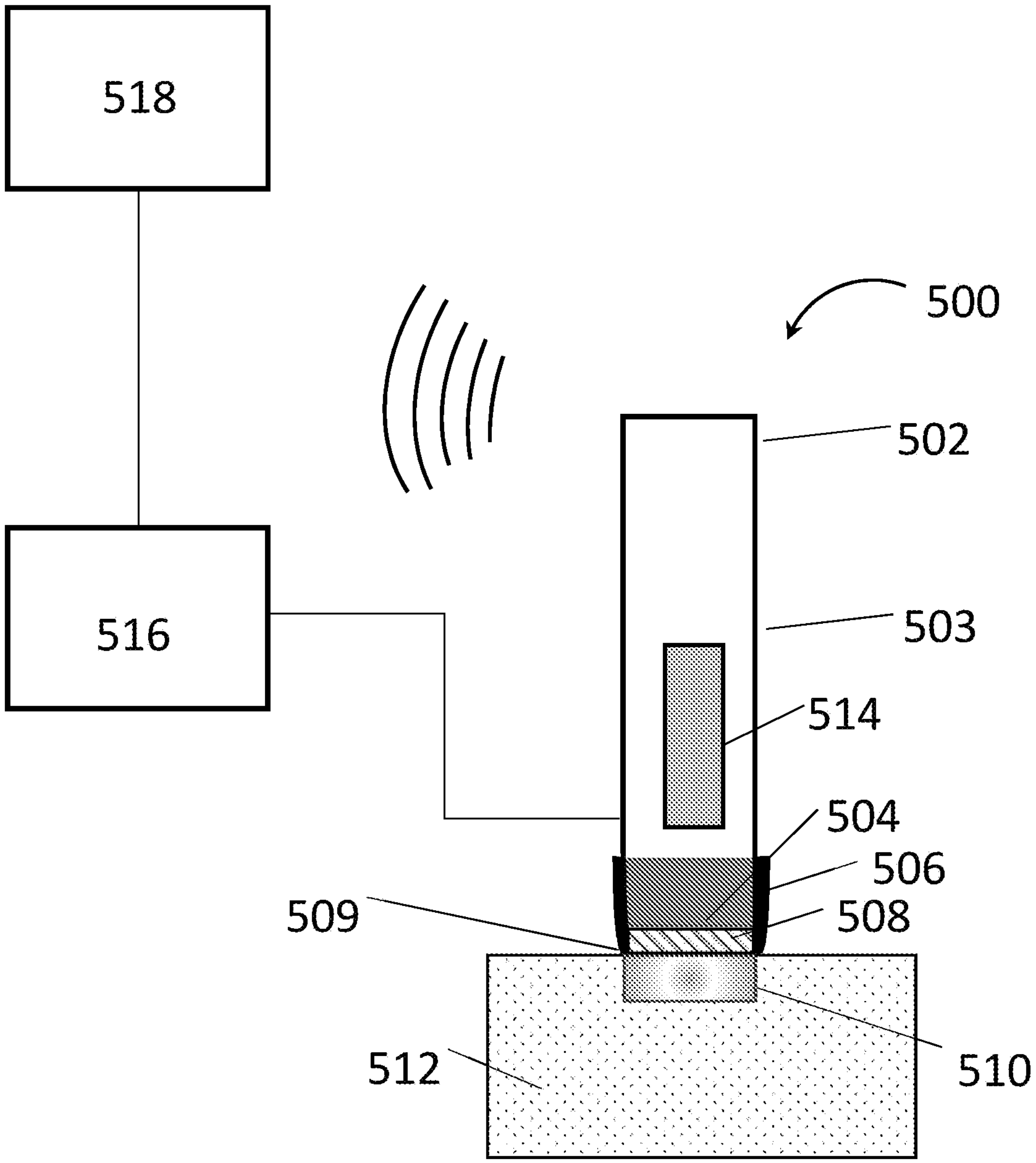
FIG. 5 is a schematic representation of an optical elastography device in accordance with an embodiment.

One embodiment of the present invention uses an elastography system comprising an elastography device such as mentioned above, an attachment such as attachments 100 or 200 attached to the elastography device, and a deformable sensing layer that is coupled to the attachment at the ring-like portions 106, 206. FIG. 5 illustrates an optical elastography system 500 that comprises a hand-held optical elastography device 502 provided in the shape of a pen. The hand-held optical elastography device 502 comprises an elongated hand-held optical probe 503 having a transmission portion 504 at its end portion for transmission of electromagnetic radiation towards a sample material 512, an attachment 506 that is secured to the end portion 504 of the elongated optical probe 503 of the elastography device 502 and that is similar to either one of the schematically represented attachments 100, 200. The optical elastography system 500 thus also comprises a sensing layer 508 that is coupled to the attachment 506. The hand-held optical elastography device 502 is positioned with a sensing surface 509 of the sensing layer 508 in indirect contact (through the flexible layer, such as layer 118 or 218) at a surface area 510 of the sample material 512, such as a biological tissue. In this embodiment, the sensing layer 508 has a predetermined deformation-dependent optical property and comprises a material that changes colour or transmissivity upon application of an axial load. The hand-held probe 502 is camera based and is equipped with a light detector 514 that is positioned such that light transmitted through the sensing layer 508 from the sample area 510 of the sample material 512, in response to emitting and transmitting light through the sensing layer 508 towards the surface area 510, can be detected. In this regard, it is envisaged that a light source (not shown) is provided within the optical probe 502 for directing light through the sensing layer 508. In the present illustrated example, the optical probe 502 comprises the light detector 514, which is provided in the form of a camera, such as a digital charge coupled device (CCD) camera. The optical elastography system 500 is arranged such that the electromagnetic radiation is transmitted through the sensing layer 508 towards the sample material 512 and when an axial load is applied through the sensing layer 508, the sensing layer 508 can expand laterally relative to a longitudinal axis of the optical probe 503 and elastography device 502. Because of the predetermined deformation-dependent optical property of the sensing layer 508, deformation of the sensing layer 508 influences the light within the sensing layer 508 such that the light detected by the camera 514 is a measure for the change in optical property of the sensing layer and consequently for the mechanical property of the sample material 512 at the surface area 510. In a variation of the described embodiment the camera 514 may be replaced by a suitable stereoscopic vison set up as disclosed in the applicants co-pending PCT international application PCT/AU2019/051171.

The camera-based optical elastography device 500 is coupled wirelessly, such as using Wi-Fi or Bluetooth, to a microprocessor 516 in communication with a graphical interface 518, whereby a system 520 for evaluating a mechanical property of the sample material 512 is formed. The microprocessor 516 may be provided in the form of a computer such as a desktop computer, or in form of a mobile device, such as a tablet or a mobile phone. The microprocessor 516 is configured to receive, an electrical signal from the optical elastography device 500. The signal is indicative of information associated with the light detected by the CCD camera 514. The information can then be used by the microprocessor 516 and the graphical interface 518 and be converted into an image. The image is indicative of a distribution of stress and deformation across the sensing layer 508.

In another embodiment, the attachment is adapted for attaching to an optical probe of an OCT elastography device. In this embodiment, the sensing layer does not have a deformation-dependent optical property, but is transparent for the electromagnetic radiation and the OCT elastography device uses OCT to scan the depth of the sensing layer and obtain a depth profile of the sensing layer represented in an OCT image. The information obtained using OCT can then be used to characterise the mechanical property of the sample material, such as the elasticity of the sample material.

In again another embodiment, the attachment is adapted for attaching to an optical probe of an optical elastography device, which may be handheld and unlike OCT does not require scanning the entire thickness of the sensing layer for obtaining information relating to a mechanical property of the sample material. In this embodiment, the sensing layer is also transparent for the electromagnetic radiation and the mechanical property of the sample material can be derived based on the knowledge of the initial thickness of the sensing layer (before the axial load is applied) and based on the change in thickness of the layer as detected from the interface of signals reflected at bottom and top interfaces of the layer when the axial load is applied. The detected interference signals provide information about a change in the relative position of the interfaces between the sensing layer and the sample material and consequently about the change in thickness of the layer.

In another embodiment, the elastography device is not an optical elastography device but may be an MRI-based elastography device or an acoustic elastography device, such as an ultrasonic elastography device, comprising a probe having a transmission portion for transmission of acoustic waves.

Modifications and variations as would be apparent to a skilled addressee are determined to be within the scope of the present invention. For example, a skilled addressee will appreciate that in a variation of the described embodiment the sensing layer 108, 208 or 508 may comprise a compressible material such as a sponge-like material or another material that may have air pockets and a has a compressible volume.

The invention claimed is:

1. An attachment for an elastography and/or imaging device, the device having a transmission portion for transmission of electromagnetic radiation or acoustic waves towards a sample material, the attachment comprising:

a securing portion for securing the attachment to the device; and a sensing portion coupled to the securing portion, the sensing portion being adapted to receive a deformable sensing layer that is at least partially transmissive for the electromagnetic radiation or the acoustic waves;

wherein the attachment is arranged such that, when attached to the device and the sensing layer is received at the sensing portion, the electromagnetic radiation is in use transmitted through the sensing layer or the acoustic waves are transmitted through the sensing layer towards the sample material, and when a load is applied to the sample material through the sensing layer, the sensing layer deforms.

2. The attachment of claim 1 wherein the attachment is arranged such that, when attached to the device and the sensing layer is received at the sensing portion, the electromagnetic radiation is in use transmitted through the sensing layer or the acoustic waves are transmitted through the sensing layer towards the sample material, and when the load is applied to the sample material through the sensing layer, the sensing layer expands laterally relative to a longitudinal axis of the device.

3. The attachment of claim 1, wherein the device comprises a probe and the attachment is arranged for attachment to the probe.

4. The attachment of claim 1, comprising the sensing layer, wherein:

the sensing layer is located at the sensing portion using straps or layers of a flexible material;

the sensing layer is sandwiched between the layers or straps of the flexible material;

the sensing layer comprises a material that:

has a largely incompressible volume; and/or is at least partially compressible; and/or the sensing layer has a predetermined deformation-dependent optical property.

5. The attachment of claim 1, wherein the attachment comprises at least one of: a cavity into which the sensing layer can laterally expand when the load is applied to the sample material through the sensing layer; and a lubrication material at the sensing layer to reduce friction between the sensing layer and a component of the device with which the sensing layer is in contact during use, the lubrication material being arranged to penetrate into the cavity when the load is applied to the sample material through the sensing layer; and/or the attachment is arranged for attachment to a probe of the device.

6. The attachment of claim 1, wherein the attachment comprises an end-portion at the sensing portion, the end-portion comprising an undulated edge having projections projecting inwardly, the projections being separated by recesses, wherein the end-portion is arranged such that a portion of the sensing layer can laterally expand into or through the recesses between the projections when an axial load is applied to the sample material through the sensing layer.

7. The attachment of claim 1, wherein: the attachment further comprises a lubrication material at the sensing layer to reduce friction between the sensing layer and a component of the device with which the sensing layer is in contact during use; and the attachment comprises an end-portion at the sensing portion, the end-portion comprising an undulated edge having projections projecting inwardly, the projections being separated by recesses wherein the end-portion is arranged such that the lubrication material can penetrate into or through the recesses between the projections when an axial load is applied to the sample material through the sensing layer.

8. The attachment of claim 1, wherein:

the attachment is adapted for removably attaching to the device;

a cross-sectional shape of the attachment is approximately U-shaped when the sensing layer is received by the attachment;

the attachment has a generally cylindrical shape; and/or at least outer surface portions of the attachment are formed from a bio-compatible material.

9. The attachment of claim 1, wherein:

the securing portion has at least one side portion arranged for engaging with a side portion of the device;

the sensing portion of the attachment is a bottom portion coupled to the at least one side portion;

the at least one side portion comprises a locking portion arranged to interlock with a corresponding locking portion of the side portion of the device; and/or the at least one side portion of the attachment engages with the side portion of the device using:

a snap-fit; or a twist-lock or Luer-lock mechanism.

10. The attachment of claim 1, further comprising a protective sheath arranged to cover at least a portion of an exposed area of the attachment, wherein:

the protective sheath extends along at least a portion of an exposed area of the device when the attachment is attached to the device; and/or the protective sheath is a first protective sheath and is arranged to cover at least a portion of an exposed area of the attachment, wherein the attachment further comprises a second protective sheath arranged to cover at least a portion of an exposed area of the device when the attachment is attached to the device.

11. The attachment of claim 1, wherein the device is an elastography device, the elastography device being:

an optical elastography device further comprising an optical imaging window at the sensing portion, the optical elastography device, with the attachment, being arranged to direct the electromagnetic radiation from the elastography device through the imaging window and, when the sensing layer is received, subsequently through the sensing layer, towards the sample material; or an optical coherence tomography elastography device;

an ultrasonic device; or an MRI-based device.

12. The attachment of claim 1, wherein:

the device is hand-held;

the attachment is disposable; and/or the sensing layer comprises a silicone material.

13. An elastography and/or imaging system comprising: an elastography and/or imaging device having a transmission portion for transmission of electromagnetic radiation or acoustic waves towards a sample material; an attachment comprising: a securing portion for securing the attachment to the device; and a sensing portion coupled to the securing portion, the sensing portion being adapted to receive a deformable sensing layer that is at least partially transmissive for the electromagnetic radiation or the acoustic waves, wherein the deformable sensing layer is coupled to the attachment at the sensing portion, and wherein the system is arranged such that, when the attachment is secured to the device, the deformable sensing layer is received at the sensing portion and the device is used, the electromagnetic radiation is transmitted through the deformable sensing layer or the acoustic waves are transmitted through the deformable sensing layer towards the sample material, and when a load is applied to the sample material through the deformable sensing layer, the deformable sensing layer deforms.

14. The system of claim 13, wherein the system is arranged such that when the load is applied to the sample material through the sensing layer, the sensing layer expands laterally relative to a longitudinal axis of the device.

15. The system of claim 13, wherein the device comprises an elongated probe having an end portion for the transmission of the electromagnetic radiation or acoustic waves towards the sample material, and wherein the attachment is secured to the end portion of the elongated probe.

16. The system of claim 13, wherein a sensing surface of the deformable sensing layer is adapted for positioning in direct or indirect contact with a surface area of the sample material.

17. The system of claim 13, wherein:

the attachment comprises a flexible material that has a largely incompressible volume;

the device is an optical elastography device; and/or the deformable sensing layer has a predetermined deformation-dependent optical property.

18. The system of claim 17, wherein the elastography system is arranged such that a mechanical property of the sample material is measurable by detecting electromagnetic radiation or acoustic waves that are transmitted through the deformable sensing layer from the sample material in response to the transmitting of the electromagnetic radiation or acoustic waves through the deformable sensing layer towards the sample material.

* * * * *